(12) United States Patent
Gage

(10) Patent No.: US 8,554,718 B2
(45) Date of Patent: Oct. 8, 2013

(54) METHOD AND SYSTEM FOR CLIENT CONTEXT DISSEMINATION FOR WEB-BASED APPLICATIONS

(75) Inventor: William A. Gage, Stittsville, CA (US)

(73) Assignee: Rockstar Consortium US LP, Plano, TX (US)

(*) Notice: Subject to any disclaimer, the term of this patent is extended or adjusted under 35 U.S.C. 154(b) by 942 days.

(21) Appl. No.: 12/123,939

(22) Filed: May 20, 2008

(65) Prior Publication Data

US 2009/0327401 A1     Dec. 31, 2009

Related U.S. Application Data

(60) Provisional application No. 61/027,980, filed on Feb. 12, 2008.

(51) Int. Cl.
*G06F 15/16* (2006.01)

(52) U.S. Cl.
USPC .......................... 707/203; 709/219

(58) Field of Classification Search
USPC .................................. 709/203, 219
See application file for complete search history.

(56) References Cited

U.S. PATENT DOCUMENTS

| | | | |
|---|---|---|---|
| 7,076,562 B2* | 7/2006 | Singhal et al. ................ 709/232 |
| 7,463,620 B2* | 12/2008 | Wang et al. .................. 370/352 |
| 7,725,405 B2* | 5/2010 | Johnson .......................... 705/321 |
| 2003/0018692 A1* | 1/2003 | Ebling et al. ................... 709/108 |
| 2004/0078331 A1* | 4/2004 | Fakih ............................... 705/40 |
| 2005/0204170 A1* | 9/2005 | Belenky et al. ............... 713/201 |
| 2006/0200677 A1* | 9/2006 | Marinescu ..................... 713/182 |
| 2007/0202844 A1* | 8/2007 | Wilson et al. ............. 455/404.2 |
| 2008/0103923 A1* | 5/2008 | Rieck et al. ..................... 705/26 |
| 2008/0108302 A1* | 5/2008 | Linnamaki et al. .......... 455/3.06 |
| 2008/0114690 A1* | 5/2008 | Skidmore et al. ............... 705/52 |
| 2008/0140806 A1* | 6/2008 | Kumar .......................... 709/219 |
| 2008/0184276 A1* | 7/2008 | Jong ............................. 719/321 |
| 2008/0189360 A1* | 8/2008 | Kiley et al. .................... 709/203 |
| 2008/0263633 A1* | 10/2008 | Banga et al. ..................... 726/3 |
| 2009/0063491 A1* | 3/2009 | Barclay et al. .................... 707/9 |
| 2009/0132540 A1* | 5/2009 | Hjelm et al. .................... 707/10 |
| 2009/0282468 A1* | 11/2009 | Banga et al. ..................... 726/8 |
| 2010/0128666 A1* | 5/2010 | Masson et al. ................ 370/328 |

* cited by examiner

*Primary Examiner* — Firmin Backer
*Assistant Examiner* — Jonathan Bui
(74) *Attorney, Agent, or Firm* — Christopher & Weisberg, P.A.

(57) ABSTRACT

A method advertises the existence of a subscriber profile service on a communication network. A first data request sent from a client device to an application server is intercepted. The first data request is modified by inserting an advertisement of contextual information relating to the existence of the subscriber profile service into the first data request prior to transmission to the application server. The modified data request is transmitted to the application server.

14 Claims, 10 Drawing Sheets

METHOD AND SYSTEM FOR CLIENT CONTEXT DISSEMINATION FOR WEB-BASED APPLICATIONS

CROSS-REFERENCE TO RELATED APPLICATION

This application is related to and claims priority to U.S. Provisional Patent Application Ser. No. 61/027,980, filed Feb. 12, 2008, entitled METHOD AND SYSTEM FOR CLIENT CONTEXT DISSEMINATION FOR WEB-BASED APPLICATIONS, the entirety of which is incorporated herein by reference.

STATEMENT REGARDING FEDERALLY SPONSORED RESEARCH OR DEVELOPMENT n/a

FIELD OF THE INVENTION

The present invention relates generally to web-based applications and in particular to a method and system for enabling context-aware services on the Internet.

BACKGROUND OF THE INVENTION

Context aware services are often cited as essential value-added services for clients on the World Wide Web ("WWW"). These services generally fall into one of two categories, namely, Context-Aware Client-Side services, and Context-Aware Server-Side services. Context-Aware Client-Side services are provided directly to the end user by their client device with or without support from the network infrastructure. The service is provided by an application running on the client device, e.g., a street mapping application, that uses capabilities of the device, e.g., a built-in Global Positioning System receiver, and/or information stored in the device, e.g., a street map database.

Context-Aware Server-Side services are provided to the end user by an Application Server located somewhere within the global Internet-at-large using contextual information provided by the access network infrastructure or by the client device itself. One example is a display of advertisements based on the demographics of the end user. Here, the "end user" is defined as a person using the client device, an application running on the client device, or an application running on a secondary device connected to the client device.

The client-side services are specifically designed for use with client devices and may be self-contained, using contextual information gathered directly by the device itself. By contrast, server-side services are usually device-independent and are deployed far from where the client device is attached to the network. In order to offer a context-aware service, an Application Server may obtain current contextual information either from the client device itself or from another source.

The models defined by various consortiums require that the Application Server obtain contextual information for a particular client in one of three ways. The first way is by requesting contextual information from a Subscriber Profile Server ("SPS") within a service provider's network whenever the client device accesses a service offered by the Application Server. The second method is by registering with a Subscriber Profile Server in order to receive updates from the Subscriber Profile Server whenever there are updates to (elements of) a particular client's profile. The third method is by requesting manual (re-)entry of the required contextual information by the subscriber whenever the client device accesses a service offered by the Application Server.

With the possible exception of manual entry procedures, these protocols and procedures for context-aware services are not currently in wide use throughout the Internet-at-large despite an apparent demand for such services. In part, this is because the mechanisms defined by standards bodies for interacting with the Subscriber Profile Servers are incompatible with the mode of operation employed by the majority of Internet-based Application Servers.

Techniques previously used to obtain contextual information include use of the WHOIS database, use of the Domain Name System ("DNS") database, deconstructing routing table and the use of Hypertext Transfer Protocol ("HTTP") cookies. Other techniques previously used to obtain contextual information include frameworks for location-based services and federated identity-based services. Various industry forums have defined (and deployed) protocols that allow an arbitrary application to access the client information maintained within a Network Access Service Provider's network. However these solutions suffer from a number of problems.

For example, the framework and protocols defined by various industry forums are not compatible with those used by the majority of Internet-based Application Servers. As a consequence, both the Network Access Service Provider and Application Service Providers incur a significant investment in order to enable and deploy context-aware services. Also, there is assumed to be a pre-existing relationship between an Application Service Provider ("ASP") and the Network Access Service Provider ("NASP"). In particular, the ASP is registered with the NASP and must have a valid subscription to the subscriber services offered by the NASP in order to access the client profile information. Finally, the Application Server must be endowed with knowledge of the relationship between a Client Device and a Subscriber Profile Server either to register for notification of profile updates or to request profile information whenever a client of the Subscriber Profile Server attempts to access an ASP service. This knowledge does not exist in any (publicly) accessible database.

The WHOIS database identifies the business entity that owns a particular block of Internet Protocol ("IP") addresses. Some Application Servers attempt to use this database to provide a primitive form of context-aware service by matching the IP address of a Client Device with an entry in the WHOIS database. This technique, however, also suffers from a number of problems. For example, the "location" in the WHOIS database is actually the business address of the registered owner and does not reflect the location of the Client Device itself or the location where the IP address is being used. Further, the results may be misleading, especially for large blocks of IP addresses. For example, an entire block of addresses assigned to Nortel (47.0.0.0/8) maps to "Ottawa" regardless of where in the world a Nortel address is actually used. In addition, the information in the WHOIS database is manually administered and is not dynamic. A Client Device may change its point of attachment but this will not be obvious to an Application Server until and unless the Device is allocated a new address within a different administrative domain.

The DNS database maps IP addresses to structured names and a variety of other data. Some Application Servers attempt to use this database to provide a primitive form of context-aware service by matching the IP address of a client device with an entry in the DNS database. This technique, however, also suffers from a number of problems. For instance, ownership of a "name" in the DNS database is assigned on a first-come-first-served basis. Ownership of a meaningful name does not necessarily imply anything meaningful about an IP address that appears to belong to that domain name. The results may also be misleading, especially for large blocks of IP addresses. For example, the entire block of addresses assigned to Nortel (47.0.0.0/8) maps to "nortel.com" regardless of which device is using the address and where in the world a Nortel address is actually used. Finally, the source address in an IP packet header may be transformed through Network Address Translation ("NAT") thus obscuring any contextual information that might have been gleaned from the IP address actually assigned to the client device.

In theory, routing tables may be used to learn the topology of a network and, thus, to determine where the client device is attached to the network. In practice, however, this is not feasible for a number of reasons. First, routing information in the Internet-at-large is aggregated so that a large number of destinations are represented by a single routing table entry. As a result, the further a router or server is from the client device, the more imprecise the routing information will be. In addition, routing domains are explicitly established to prevent detailed routing information from flooding into the Internet-at-large. Therefore, many (large) subnets appear as "dark clouds" to the rest of the Internet with no visible topological information for identifying where a client device is attached.

HTTP servers usually respond to each client request without relating that request to previous or subsequent requests. "Cookies" are pieces of contextual information that a server provides to a client in the header of an HTTP response to a client data request. The client then includes that information in the header of a subsequent HTTP data request so that the server may maintain context across a series of client requests. This technique, however, also suffers from a number of problems. For example, cookies contain information related to context at the server. They cannot be used by the client to autonomously provide information to the server. While cookies can be used by the server to store subscriber contextual information, the information is usually extracted from a form completed by the subscriber. This requires an initial transaction (or set of transactions) to present and complete the form before the server can act on that information. The structure and content of a cookie is meaningful only to the Application Server that issued the cookie. Cookies cannot, in general, be used as a mechanism to share information between applications offered by different ASPs. Cookies have a limited lifetime and often do not persist beyond the lifetime of a single session between a client and a server.

It is therefore desirable to have a method and system that builds on widely-adopted protocols and transactions in order to advertise the existence of contextual information to the Internet-at-large and for disseminating both public and private variants of that contextual information.

SUMMARY OF THE INVENTION

The present invention advantageously provides a method and device for announcing the availability of contextual information relating to a subscriber or client device to other application service providers in a communication network. Generally, the present invention advantageously provides a means for a network access service provider to announce the existence of a subscriber profile service by intercepting a data request initiated from the client device to an application server and amending the header of the data request to notify the intended recipient application server that the network access service provider has additional information concerning the subscriber that may be beneficial to the application server.

One aspect of the present invention provides a method for advertising the existence of a subscriber profile service on a communication network. A first data request sent from a client device to an application server is intercepted and modified by inserting an advertisement of contextual information relating to the existence of the subscriber profile service into the first data request prior to transmission to the application server. The modified data request is transmitted to the application server.

In accordance with another aspect, the present invention provides a network access service device that includes a subscriber profile service and a client proxy. The subscriber profile service has contextual information relating to at least one of a client and a subscriber. The client proxy is communicatively coupled to the subscriber profile service. The client proxy intercepts a first data request sent from the client device to an application server on a communication network. The client proxy modifies the data request by inserting an advertisement of contextual information relating to the existence of the subscriber profile service into the first data request prior to transmission to the application server. The client proxy transmits the modified data request to the application server.

In accordance with still another aspect, the present invention provides a method for announcing contextual information maintained at a subscriber profile server on a communication network. The contextual information relates to at least one of a client device and a subscriber to a network access service provider. A first data request sent from the client device to an application server is intercepted. The data request is modified by inserting the contextual information into the first data request as an extension header prior to transmission to the application server. The modified data request is transmitted to the application server.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
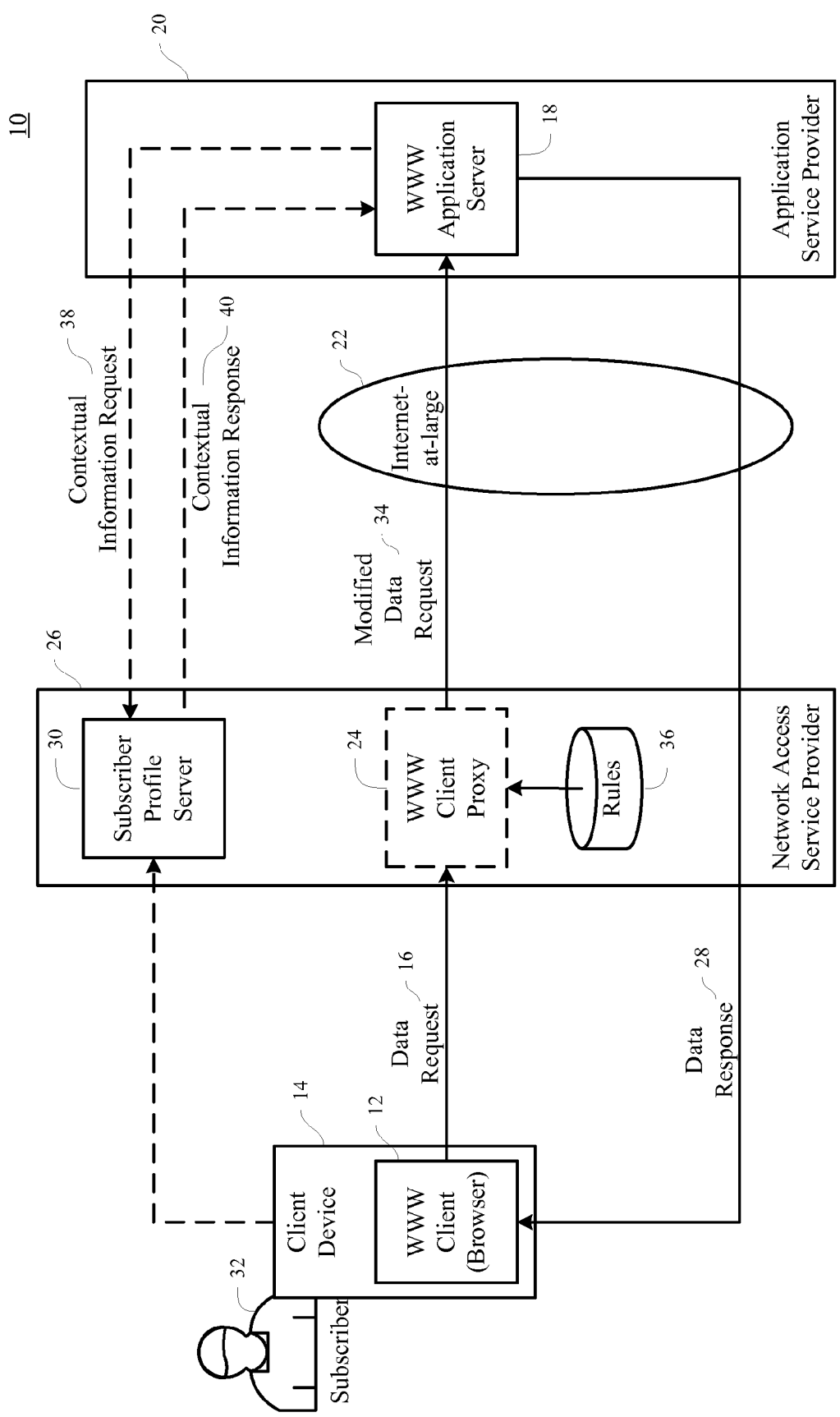
FIG. 1 is a block diagram of an exemplary web-based client-server transaction constructed in accordance with the principles of the present invention.

Before describing in detail exemplary embodiments that are in accordance with the present invention, it is noted that the embodiments reside primarily in combinations of apparatus components and processing steps related to implementing a system and method for modifying existing transactions in order to advertise the existence of contextual information to the Internet-at-large and for disseminating both public and private variants of that contextual information. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention enables the use of context-aware services by making application servers aware that contextual information exists and is available for their use. This disclosure extends context-aware services to application servers anywhere in the Internet, not just to those servers that implement certain industry-specific frameworks. In particular, this invention improves upon accepted techniques for extending widely used WWW transport protocols such as Hyper-Text Transfer Protocol ("HTTP"), Hypertext Transfer Protocol over Secure Socket Layer ("HTTPS"), Real Time Streaming Protocol ("RTSP"), and Simple Object Access Protocol ("SOAP"), in order to advertise and disseminate client contextual information.

Another embodiment of the present invention extends context-aware services to Application Servers anywhere in the Internet by building on the transaction frameworks and protocols already employed throughout the web. In particular, this invention uses accepted techniques for extending widely used WWW protocols, e.g., HTTP, RTSP, in order to advertise and disseminate client contextual information.

The protocol extension techniques employed by embodiments of the present invention follow the conventions used by the Internet-at-large to ensure that context-aware services can be incrementally added to web-based Application Servers when and if the opportunity is present. No penalty or overhead is incurred by Application Servers that do not offer context-aware services. At the same time, a Network Access Service Provider can advertise and/or distribute information to enable the development of context-aware services in the Internet-at-large without the expense and overhead of creating a unique business relationship with each potential Application Service Provider. This decoupling of operations in the Network Access Service Provider system from operations in the Application Service Provider system allows context-aware services to be added incrementally and within the framework of widely used WWW transactions.

Referring now to the drawing figures in which like reference designators refer to like elements, there is shown in FIG. 1 a system 10 for processing a web-based transaction. A WWW client 12, e.g., a browser or a media player, located on a client device 14 sends a data request 16, e.g., HTTP GET, to a WWW application server 18 operated by an application service provider ("ASP") 20 somewhere in the network, e.g., the Internet-at-large 22. This data request 16 may pass through a WWW client proxy 24 operated by a network access service provider ("NASP") 26 before being forwarded towards the WWW application server 18. The WWW application server 18 processes the data request 16 and sends a data response 28, e.g., HTTP 200 OK, to the WWW client 12.

The network access service provider 26 may also maintain a subscriber profile server 30 to store information regarding the subscriber 32 and/or the client device(s) 14 used by the subscriber 32. Some of the contextual information may be static, e.g., the demographics of the subscriber 32 or the characteristics of the client device 14, and may be entered manually by NASP operations personnel or by the subscriber 32. Other elements of the contextual information may be dynamic, e.g., the current location of a mobile device or the current balance in a credit account, and may be updated in real-time by elements of the network or by the client device 14.

In order to provide contextual information to web-based application servers 18, the WWW client proxy 24 inserts information into the data request 16 received from the WWW client 12 before forwarding the modified data request 34 to a WWW application server 18. For example, in one embodiment, the client proxy 24 may be located in the network operated by the network access service provider 26 where the client proxy 24 intercepts data requests 16 using well-known packet filtering and connection redirection techniques. In another embodiment, the client proxy 24 may be located in the client device 14, allowing contextual information to be inserted into the data request 16 by the device 14 if it is able to offer contextual services directly to application servers 18. The information inserted into the request 16 may take one of several forms.

For example, the information may be an advertisement whereby the proxy 24 indicates that the network access service provider 26 has contextual information available and how that information may be accessed. The application server 18 may initiate a separate (secure) transaction in order to retrieve that information. In another example, the information is a public announcement whereby the proxy 24 causes contextual information related to the subscriber 32 and/or the client device 14 to be included in the modified data request 34 sent to the application server 18. Contextual information sent using this method is unsecured and is available to any and all entities that are capable of reading the data request 34 as it passes through the network 22 to the destination server 18. In yet another example, the information is a private announcement, whereby the proxy 24 causes an encrypted form of the contextual information to be included in the modified data request 34 sent to the application server 18. Contextual information sent using this method is available only to the destination server(s) 18 that have prior knowledge of the encryption methods and keys used by the network access service provider 26. In yet another example, the announcement refers to a profile that has been previously exchanged between the network access service provider 26 and the application service provider 20. Contextual information sent using this method is available only to an application server 18 that has prior knowledge of the profile referenced by the network access service provider 26.

The type of information to be inserted into a data request 16 is dictated by a set of rules 36 that are consulted by the client proxy 24 whenever it intercepts a request 16. The rules 36 may, for example, describe the contextual information to be disseminated based on the identity of the client 12 and/or on the identity of the target application server 18 and based on the privacy control preferences expressed by the subscriber 32.

Under certain conditions, the application server 18 may send a contextual information request 38 to the subscriber profile server 30 requesting the subscriber profile server 30 to forward contextual information advertised in the modified data request 34 to the application server 18. The subscriber profile server 30 then sends the requested contextual information to the application server 18 in a contextual information response 40.

Figure 2:
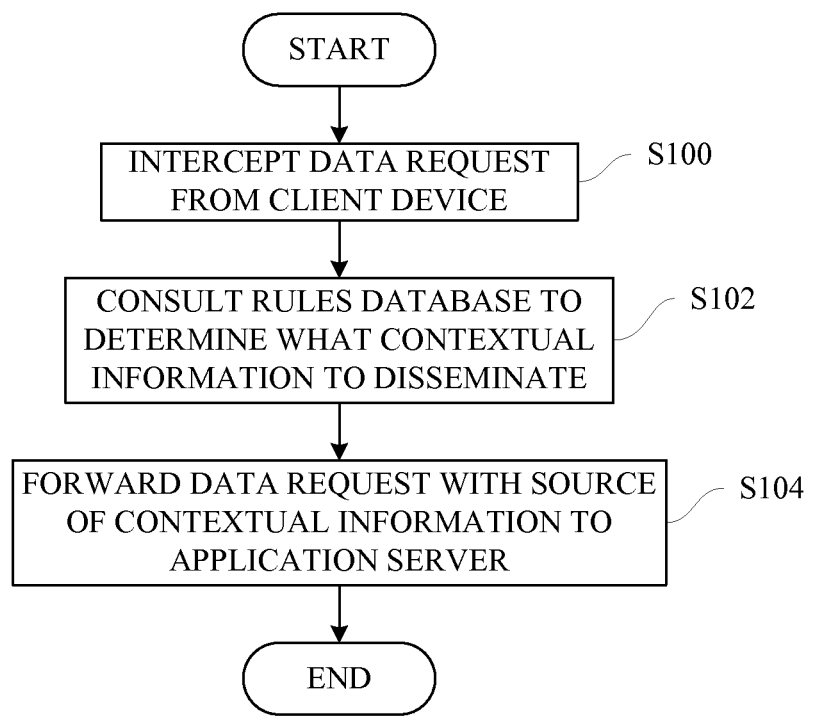
FIG. 2 is a flowchart of an exemplary contextual information transaction process performed by a WWW client proxy according to the principles of the present invention.

An operational flowchart describing an exemplary process performed by a WWW client proxy 24 to perform a typical contextual information transaction in accordance with the present invention is described with reference to FIG. 2. A WWW client proxy 24 from the network access service provider 26 intercepts a data request (step S100) that has been constructed and sent from a WWW client 12 on the client device 14. The data request 16 has the WWW application server 18 designated as the target destination. Typical data request messages may include HTTP HEAD, GET or POST for text and image retrieval and file transfers, RTSP DESCRIBE, SETUP and PLAY for streaming audio/video media retrieval, and SOAP RPC Request for initiation of a web-based service transaction. The proxy 24 consults its rules database 36 (step S102) to determine the type of contextual information relevant to this request (if any) and causes the data request 16 to be modified through the insertion of an advertisement, public announcement, private announcement or pre-defined profile announcement as appropriate. The network access service provider 26 forwards the modified data request 34 to the target WWW application server 18 (step S104).

Figure 3:
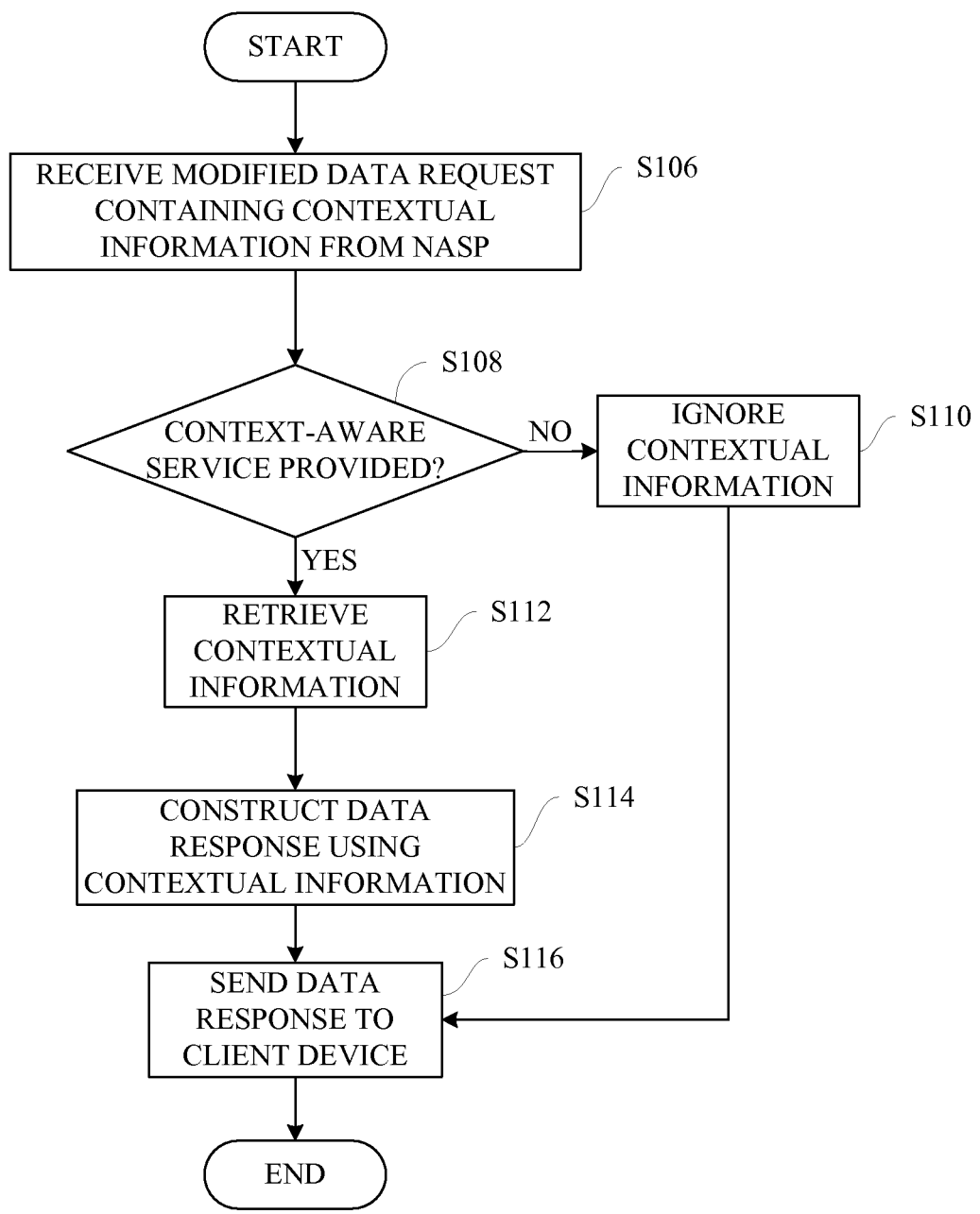
FIG. 3 is a flowchart of an exemplary contextual information transaction process performed by an application service provider according to the principles of the present invention.

In FIG. 3, an exemplary operational flowchart is provided that describes steps performed by an application service provider 20 in completing the typical contextual information transaction. A WWW application server 18 of the application service provider 20 receives the modified data request 34 (step S106) from the network access service provider 26. The modified data request 34 contains the contextual information inserted by the client proxy 24. If the server 18 does not offer a context-aware service (step S108), the contextual information in the data request 34 is simply ignored (step S110). If the application server 18 does offer a context-aware service (step S108), the application server 18 retrieves contextual information appropriate to this client 12 using the information contained in the data request 34 (step S112). The WWW application server 18 constructs a data response 28 using the contextual information specific to this client 12 (step S114). Typical data response messages 28 may include an "HTTP 200 OK" message containing a HyperText Markup Language ("HTML") document and/or an attachment tailored to the context of the client device 14, an "RTSP 200 OK" or 3xx Redirection message containing a Uniform Resource Locator ("URL") and/or a User Datagram Protocol ("UDP") port number for a media stream or playlist tailored to the context of the client device 14, or a "SOAP RPC" response for returning the results of a web-based service tailored to the context of the client device 14. The application server 18 then returns the data response 28 to the WWW client 12 on the client device 14 (step S116).

The different forms of contextual information offered by the network access service provider 26—advertisement, public announcement, private announcement and pre-defined profile announcement—ensure that the network access service provider 26 retains control over the contextual information that is revealed and to whom it is revealed. For example, advertisements may be used to simply announce that contextual information is available from the network access service provider 26. Any application wishing to use contextual information as part of its service offering would then contact the SPS 30 where additional screening of the application service provider 20 and filtering of the offered contextual information may be performed.

Public announcements may be used to supply the demographics of the subscriber 32, the capabilities of the client device 14 and/or to identify the region in which the client device 14 is currently operating. This information is more explicit and potentially more useful than methods currently used by application servers 18. Private announcements may be used to provide contextual information to application service provider 20 with whom the network access service provider 26 has a predefined business arrangement. Embedding the (encrypted) contextual information directly in the data request 34 avoids the extra transaction overhead associated with use of the more general advertisement model. Pre-defined profile announcements may be used to provide contextual information to application service provider 20 with whom the network access service provider 26 has a pre-defined business arrangement. Referencing (generic) information that has been previously disseminated avoids the extra transaction overhead associated with use of the more general advertisement model and avoids the data overhead associated with the other announcement models. Note that this method is suitable for the dissemination of (semi-)static contextual information but is not, in general, suitable for the dissemination of dynamic information.

Advertisements are typically used when the network access service provider 26 does not know whether the targeted application service provider 20 offers a context-aware service. Although an advertisement requires additional work by the application server 18 to retrieve the actual contextual information, it minimizes the amount of work that is performed by the network access service provider 26, especially for those transactions that do not result in a subsequent exchange of contextual information. Announcements are typically used when the network access service provider 26 believes that the targeted application service provider 20 does offer a context-aware service. Although an announcement requires additional work by the network access service provider 26 to retrieve and insert the actual contextual information, the overall process is made more efficient by reducing the number of messages that are exchanged between the application service provider 20 and network access service provider 26 systems.

Context-aware services in a public environment can be used to generate revenue from targeted advertising. In the advertising industry, targeted advertisements, i.e. advertisements tailored to the interests of a particular consumer, are more successful and generate more follow-on revenue than untargeted advertisements. Therefore, advertisers are willing to pay more for the placement of targeted advertisements than for untargeted advertisements. For example, inserting demographic and location announcements into a search request sent to GOOGLE® may allow a network access service provider to share in the extra revenue generated by GOOGLE® through its targeted placement of sponsored advertisements. Similarly, inserting demographic and location announcements into a request to view an online movie may allow a network access service provider to share in the extra revenue generated by targeted advertising lead-ins and trailers.

Context-aware services in a private environment are particularly important for enforcing security and for enabling context-aware services. For example, inserting location and user identity announcements into a data access request 16 may ensure that sensitive information is not disseminated to unauthorized personnel or to authorized personnel who are outside of a controlled area. Similarly, inserting a location announcement into a service location request 16 may elicit a response listing the equipment located in the same room as the client device 14. The characteristics and capabilities of a client device 14 are important for optimizing the user experience when interacting with a service. For example, inserting display characteristic announcements into a data access request may allow an application to optimize the display of information that it returns to the subscriber 32.

Figure 4:
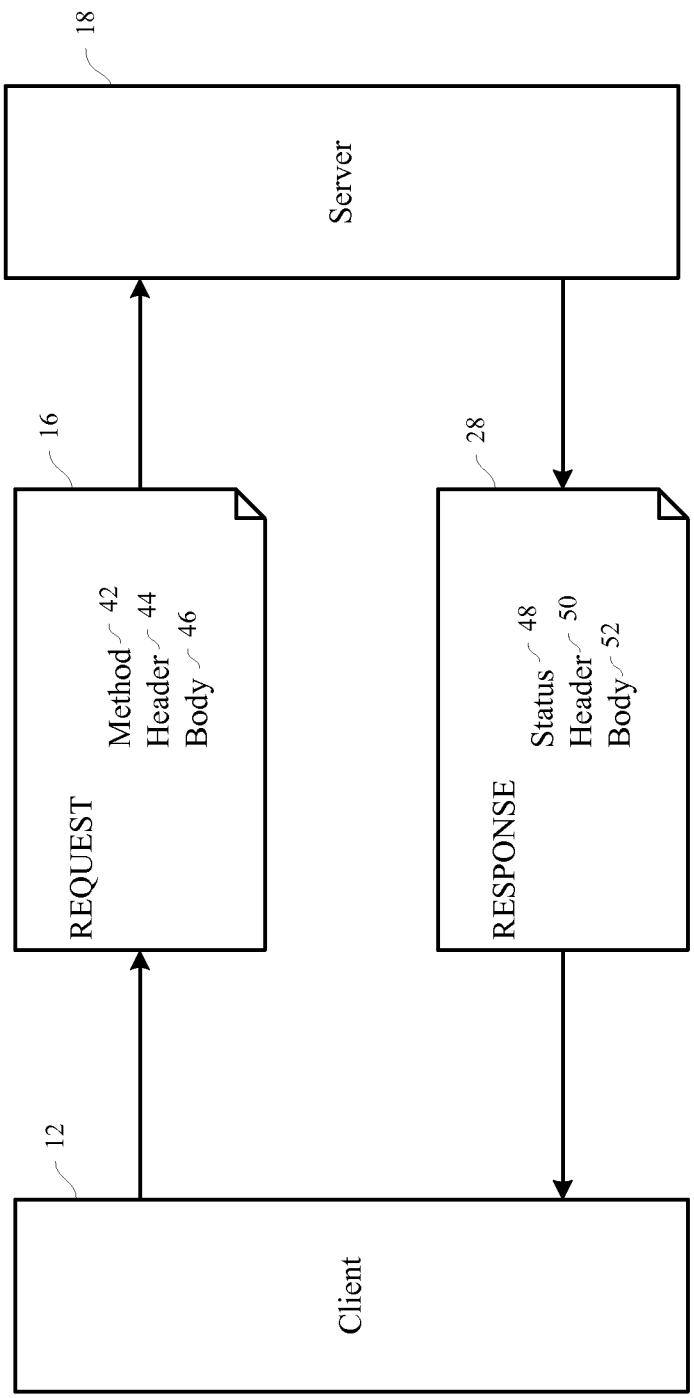
FIG. 4 is a block diagram of a generic web transaction containing structures modified in accordance with the principles of the present invention.

Referring now to FIG. 4, a block diagram of a generic web transaction protocol is provided. Many of the web application protocols in use today are transaction-oriented where a REQUEST 16 is sent from a client 12 to a server 18 and a RESPONSE 28 is sent from the server 18 to the client 12. Popular transaction-oriented protocols such as HTTP, RTSP and Simple Mail Transfer Protocol ("SMTP") are text based and follow a common structure. Each REQUEST 16 may contain the following sections: METHOD 42, which defines the operation being requested by the client 12; HEADER 44, which defines options and parameters associated with the requested operation; and BODY 46 which contains any optional data associated with the requested operation. Similarly, each RESPONSE 28 contains the following sections: STATUS 48, which defines the results of the requested operation; HEADER 50, which defines options and parameters associated with the requested operation; and BODY 52, which contains any optional data returned as a result of performing the requested operation.

The procedures described in this embodiment piggy-back on existing transactions by defining new, optional parameters in the HEADER 44 section of a REQUEST 16. No changes are made to other sections of a REQUEST 16 or to a RESPONSE 28. In keeping with generally accepted protocol extension rules, each of the context dissemination header elements begins with the prefix "X-". Servers that do not understand these elements simply ignore them and continue to process the rest of the request. Similar techniques for extending the semantics of a transaction exist in other protocols, e.g., through use of the "mustUnderstand" attribute in a SOAP envelope header.

The extension header "X-Accept-ContextQuery" may be used to advertise the existence of contextual information associated with the client 12 that is maintained by a subscriber profile server 30 within the network access service provider 26 system. The general structure of this header is:

X-Accept-ContextQuery:
<spsURL>?clientToken=<token>[; profile=<profile>[; aspect=<aspects>]] [; payment=<epsURL>] where

| | |
|---|---|
| <spsURL> | is the Uniform Resource Locator ("URL") for the Subscriber Profile Server. |
| <token> | is an opaque string that is used by the Subscriber Profile Server to retrieve context information associated with the Client. The interpretation of this string is meaningful only to (a particular implementation of) the SPS. |
| <profile> | is a subscriber profile maintained by the indicated SPS. This may, for example, be one of the following: location . . . for the current location of the device. device . . . for the characteristics of the device. demography . . . for the demographics of the subscriber. personal . . . for subscriber personal information. contact . . . for subscriber contact information. identity . . . for subscriber identity information. professional . . . for subscriber professional information. presence . . . for the current availability of the subscriber. preferences . . . for subscriber personal preferences. network . . . for network connection characteristics. |
| <aspects> | is a comma separated list of presentation aspects specific to the particular profile. For example, the location aspect may be one or more of the following: gps . . . for location in GPS co-ordinates. civic . . . for location as a civic (street) address. area . . . for location as a bounded geographic area. e164 . . . for location as a structured telephone number. org . . . for location as an organisation name. direction . . . for the direction in which the Device is moving. epr . . . indicating an end point reference (The epr aspect refers to a generic mechanism that may be used with a number of profiles) |
| <epsURL> | is the URL for an Electronic Payment Service where the cost of the contextual information service and payment options may be determined. This field is not included if there is no charge for using the contextual information service or if some other method of revenue sharing has been pre-arranged. |

The extension header, X-Profile, may be used to announce the profile of a client 12. The general structure of this header is: X-Profile: profile=<profile>, aspect=<aspect>, nonce=<random>, content=<string>
where

| | |
|---|---|
| <profile> | defines one of the subscriber profiles. |
| <aspect> | defines how the profile information is presented. For example, the location aspect may be one of:<br>gps . . . indicating (precise) GPS co-ordinates.<br>civic . . . indicating (a portion of) a civic address.<br>area . . . indicating an (imprecise) geographic area.<br>e164 . . . indicating a structured telephone number.<br>org . . . indicating an organisation name.<br>direction . . . for the direction in which the Device is moving.<br>epr . . . indicating an end point reference. |
| <random> | is the random number that was used, in conjunction with a predefined encryption method and key, to encode the content <string> in a private announcement. If this field is not present, the content <string> is provided in clear text as a public announcement. |
| <string> | contains the Client profile information expressed according to the defined <aspect>. |

Note that the <string> for an epr aspect may be a URL indicating where the end point reference is located. This extension header may also be used to announce the pre-defined profile to be associated with this Client. The general structure of the header in this case is:
    X-Profile: identifier=<string>
where

| | |
|---|---|
| <string> | references a profile previously agreed to by the ASP and NASP. The referenced profile may be specific to the Client or it may be a generic profile. |

The extension header X-Accept-ProfileEncoding may be used to indicate which profile and profile aspects are being requested by the ASP application server 18. The general structure of this header is:
X-Accept-ProfileEncoding: <profile>=<aspects>
where

| | |
|---|---|
| <profile> | defines one of the subscriber profiles listed in above. |
| <aspects> | is a comma separated list of presentation aspects specific to the particular profile. For example, the location aspect may be one or more of the following:<br>gps . . . for location in GPS co-ordinates.<br>civic . . . for location as a civic (street) address.<br>area . . . for location as a bounded geographic area.<br>e164 . . . for location as a structured telephone number.<br>org . . . for location as an organisation name.<br>direction . . . for the direction in which the Device is moving.<br>epr . . . indicating an end point reference. |

Embodiments of the present invention may include six basic methods for disseminating contextual information: advertisement of a public contextual information service and subsequent retrieval of contextual information; advertisement of an authorized contextual information service and subsequent retrieval of contextual information; an announcement of public contextual information; an announcement of private contextual information; an advertisement of an end point reference discovery service and subsequent retrieval of contextual information via a web services framework; and identification of a profile containing pre-defined contextual information. These basic methods may be combined within any given scenario. For example, a data request 16 may be modified to include both an announcement of public contextual information and an advertisement for an authorized contextual information service.

An exemplary method performed by a network access service provider 20 to insert public advertisements into an outgoing HTTP data request 16 from a client 12 and retrieve contextual information associated with the client 12 that has been deemed "public" is described with reference to the flowchart in FIG. 5. In one embodiment, the WWW client proxy 24 forwards the data request 16 to the subscriber profile server 26 which adds the contextual profile information headers to the data request 16. Although these scenarios are described using HTTP, the techniques and procedures are applicable to other protocols used in a client-server model on the network, e.g., Internet.

The WWW client 12 generates and sends an HTTP GET data request 16 towards a WWW application server 18, e.g., www.example.com in the example listed below, located within the network 12. A typical request 16 may include the following header elements:

```
GET / HTTP/1.1
Host: www.example.com
User-Agent: Mozilla/5.0 (Windows; en-US) Firefox/2.0
Accept: application/xhtml+xml,text/html
Accept-Language: en-us
Accept-Encoding: gzip,deflate
Accept-Charset: ISO-8859-1,utf-8
Keep-Alive: 30
Connection: keep-alive
```

Note that the specific header elements and values shown above are for illustrative purposes only and are not intended to limit the scope of the present invention.

The data request 16 is intercepted by a WWW client proxy 24 (step S118) of a network access service provider 26 using well-known packet filtering and connection redirection techniques. The proxy 24, based on information contained in its rules database 36, modifies the HTTP GET data request 16 by inserting advertisement elements into the header (step S120) and forwards the modified request 34 to the application server 18 (step S122). The modified request 34 that is forwarded to the application server 18 may be similar to the following:

```
GET / HTTP/1.1
Host: www.example.com
User-Agent: Mozilla/5.0 (Windows; en-US) Firefox/2.0
Accept: application/xhtml+xml,text/html
Accept-Language: en-us
Accept-Encoding: gzip,deflate
Accept-Charset: ISO-8859-1,utf-8
X-Accept-ContextQuery: http://lcs.cellular.com?clientToken=AE96;
    profile=location; aspect=civic,area
X-Accept-ContextQuery: http://hss.cellular.com?clientToken=143B;
    profile=demography; aspect=anonymous
Keep-Alive: 30
Connection: keep-alive
```

It should be noted that although the scenarios disclosed herein describe advertisement and dissemination of particular profiles, e.g., location, the mechanisms are applicable to dissemination of information for any contextual profile.

Because the information is being offered by the network access service provider 26 as "public" information, the demographic information may be anonymous to protect the identity of the subscriber 32 and the location information may be imprecise, e.g., a portion of a civic address or a geographic area, rather than precise information, e.g., Global Positioning System ("GPS") coordinates, that may be deemed "private".

The WWW application server 18, which offers a location-aware service, recognizes the advertisement elements in the modified data request 34 and initiates a separate transaction by constructing a contextual information request 38 to retrieve this client's location information from the designated subscriber profile server 30, e.g., lcs.cellular.com in the example below. The subscriber profile server 30 receives the contextual information request 38 from the application server 18 (step S124). Note that the SPS 30 may be a specialized server dedicated to the handling of specific services, such as location services.

The contextual information request 38 in this transaction may also be an HTTP GET message sent by the application server 18 to the designated subscriber profile server 30. The contextual information request 38 includes the advertised information that the application server 18 wishes to access. In the case shown below, the contextual information request 38 includes the advertised element <clientToken> provided by the client proxy 24, in a manner similar to that shown below:

```
GET /?clientToken=AE96 HTTP/1.1
Host: lcs.cellular.com
Accept: application/pidf+xml,application/xml
Accept-Language: en-us
Accept-Encoding: gzip,deflate
Accept-Charset: ISO-8859-1,utf-8
X-Accept-ProfileEncoding: location=civic
Connection: close
```

In this example, the application server 18 indicates that it will accept civic location information encoded as an XML Location Object in Presence Information Data Format ("PIDF").

The subscriber profile server 26 uses the client identifier, e.g., <clientToken>, to access the requested location information (step S126) and construct a contextual information response 40 which includes the requested location information (step S128). The subscriber profile server 30 returns the contextual information response 40 to the application server 18 (step S130) in a form such as an HTTP 200 OK message similar to that shown below:

```
HTTP/1.1 200 OK
Age: 0
Date: Mon, 24 Oct 2006 15:54:57 GMT
Last-Modified: Mon, 24 Oct 2006 15:50:04 GMT
Cache-Control: no-cache
Connection: close
Content-Length: nnn
Content-Type: application/pidf+xml; charset=ISO-8859-1
<?xml version="1.0"?>
<gp:geopriv xmlns="urn:...">
  <gp:location-info>
    <cl:civicAddress>
      <cl:country>US</cl:country>
      <cl:A1>New York</cl:A1>
      <cl:A3>New York</cl:A3>
      <cl:A4>Manhattan</cl:A4>
    </cl:civicAddress>
```

-continued
```
  </gp:location-info>
  <gp:usage-rules>
    <gp:retransmission-allowed>no</gp:retransmission-allowed>
  </gp:usage-rules>
</gp:geopriv>
```

Figure 5:
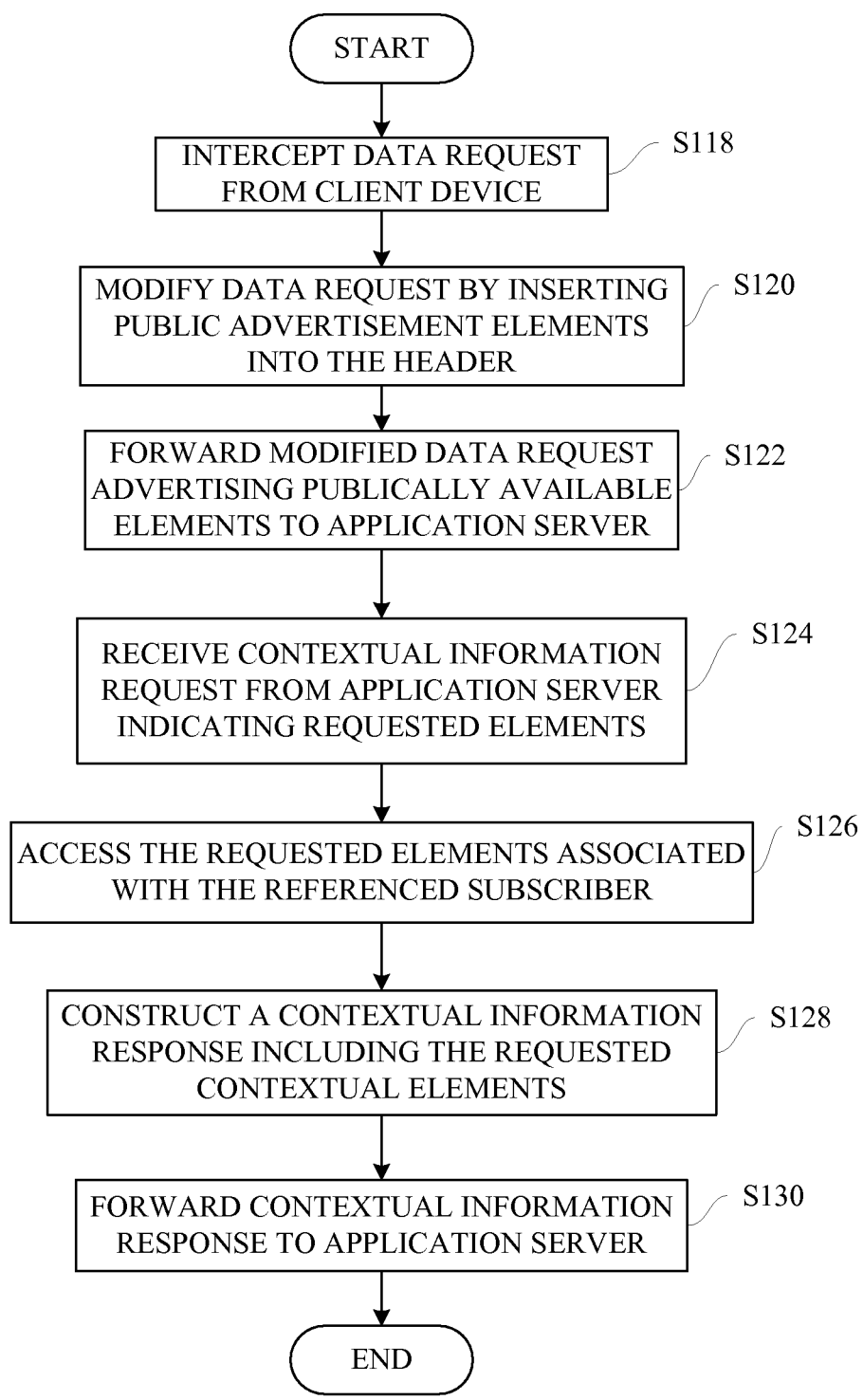
FIG. 5 is a flowchart of an exemplary contextual transaction process performed by a network access service provider, including the advertisement and retrieval of public contextual information, according to the principles of the present invention.
Figure 6:
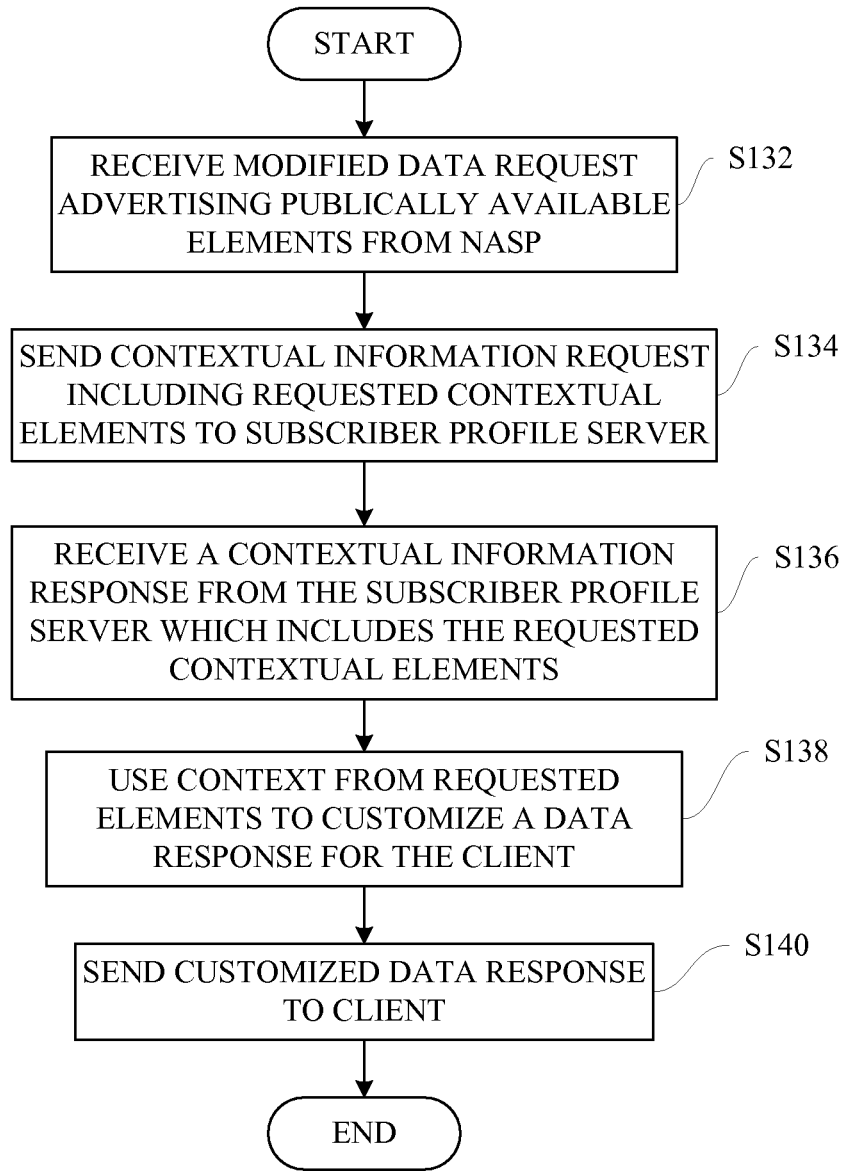
FIG. 6 is a flowchart of an exemplary contextual transaction process performed by an application service provider, including the acceptance of an advertisement and retrieval of public contextual information, according to the principles of the present invention.

An exemplary method performed by an application server 18 in response to the process defined in FIG. 5 is described with reference to the flowchart in FIG. 6. The application server 18 receives a modified data request 34 (step S132) from the client proxy 24 which includes information advertising the availability of contextual information for the client 12 that the client has authorized the network access service provider 26 to publicly release (see step S122). The application server 18 initiates a separate transaction to retrieve the client's advertised information by sending a contextual information request 38, such as a location request, to the subscriber profile server 30 of the network access service provider 26 that is designated in the modified data request 34 (step S134). The contextual information request 38 includes the advertised information that the application server 18 wishes to access (see step S124). Subsequently, the application server 18 receives (step S136) a contextual information response 40 from the subscriber profile server 30 (see step S130) which includes the context of the requested advertised elements, e.g., location information.

The application server 18 uses the context from the requested advertised elements contained in the contextual information response 40 to customize and send a data response 28, e.g., an HTTP 200 OK message as shown below, to the client 12. This customization may take the form of location-specific information, local advertisements, etc. or it may be a response that is dictated by the current location of the client 12, e.g., inside or outside their designated home service area. The response may take the appearance of the following:

```
HTTP/1.1 200 OK
Age: 0
Date: Mon, 24 Oct 2006 15:55:01 GMT
Content-Length: nnn
Content-Type: text/html; charset=ISO-8859-1
Last-Modified: Mon, 24 Oct 2006 15:55:01 GMT
<content>
```

In another embodiment, the WWW client proxy 24 inserts contextual information advertisements into an outgoing HTTP data request 16 from a client 12, allowing the WWW application server 18 to subsequently retrieve contextual information associated with the client 12 that has been deemed "private". To control access to this sensitive information, the subscriber profile server 30 may authenticate all access attempts and only provides the requested information to those application service providers 20 that have been authorized to receive private information.

An exemplary method performed by a network access service provider 20 to insert private advertisements into an outgoing HTTP data request 16 from a client 12, retrieve contextual information associated with the client 12 that has been deemed "private," and forward the private information to an authorized application service provider 20, is described with reference to the flowchart in FIG. 7. Similarly to previously discussed embodiments, a WWW client 12 generates and sends a data request 16, e.g., an HTTP GET request, towards a WWW application server 18, e.g., example.com in the example below, located somewhere in the network 22. A typical data request 16 may include the following header elements:

```
GET / HTTP/1.1
Host: www.example.com
User-Agent: Mozilla/5.0 (Windows; en-US) Firefox/2.0
Accept: application/xhtml+xml,text/html
Accept-Language: en-us
Accept-Encoding: gzip,deflate
Accept-Charset: ISO-8859-1,utf-8
Keep-Alive: 30
Connection: keep-alive
```

The data request 16 is intercepted by a WWW client proxy 24 (step S142) of a network access service provider 26 using well-known packet filtering and connection redirection techniques. The client proxy 24, based on information contained in its rules database 36, modifies the data request 16 by inserting advertisement elements into the header 40 (step S144). The client proxy 24 forwards the modified data request 34 to the application server 18 (step S146). The modified data request 34 may now be similar to the following:

```
GET / HTTP/1.1
Host: www.example.com
User-Agent: Mozilla/5.0 (Windows; en-US) Firefox/2.0
Accept: application/xhtml+xml,text/html
Accept-Language: en-us
Accept-Encoding: gzip,deflate
Accept-Charset: ISO-8859-1,utf-8
X-Accept-ContextQuery: https://lcs.cellular.com?clientToken=D7B8;
    profile=location; aspect=civic,gps
X-Accept-ContextQuery: https://hss.cellular.com?clientToken=143C;
    profile=demography; aspect=personal
Keep-Alive: 30
Connection: keep-alive
```

Because the information being offered is "private" information, e.g., precise location encoding such as a detailed street address or GPS coordinates, personal demographic information, etc., the URL for the subscriber profile server 30 may dictate use of a secure transport protocol.

The WWW application server 28, which may offer a location-aware service or other contextually-aware service, recognizes the advertisement elements in the modified data request 34 and initiates a separate transaction by sending a contextual information request 38 to retrieve this client's advertised information from the designated subscriber profile server 30, e.g., lcs.cellular.com in the example below. The contextual information request 38 in this transaction may be an HTTP GET message sent by the application server to the designated subscriber profile server 30. This contextual information request 38 may use the secure transport protocol dictated by the client proxy 24, e.g., HTTPS, and may include the advertised elements, e.g., <clientToken>, provided by the client proxy 24, similar to that shown below:

```
GET /?clientToken=D7B8 HTTP/1.1
Host: lcs.cellular.com
Accept: application/pidf+xml,application/xml
Accept-Language: en-us
Accept-Encoding: gzip,deflate
Accept-Charset: ISO-8859-1,utf-8
```

```
X-Accept-ProfileEncoding: location=civic
Connection: close
```

In this example, contextual information request 38 indicates that the application server 18 will accept civic location information encoded as an XML Location Object in Presence Information Data Format ("PIDF").

The subscriber profile server 30 receives the contextual information request 38 (step S148) and recognizes that the requested information may only be released to parties that have been authorized to receive it. If the contextual information request 38 does not include authorization credentials (step S150), the subscriber profile server 30 sends an HTTP 401 UNAUTHORIZED response to the application server 18 (step S152) indicating that the application server 18 is not currently authorized to retrieve the private contextual information. Included in this response is an authentication challenge that the application server 18 may subsequently use to present its credentials, such as:

```
HTTP/1.1 401 UNAUTHORIZED
WWW-Authenticate: Digest
    realm="cellular.com",
    qop="auth,auth-int",
    nonce="dcd98b7102dd2f0e8b11d0f600bfb0c093",
    opaque="5ccc069c403ebaf9f0171e9517f40e41"
```

The application server 18 may then repeat its contextual information request 38 and include the authorization credentials requested by the subscriber profile server 30 in a manner similar to:

```
GET /?clientToken=D7B8 HTTP/1.1
Host: lcs.cellular.com
Accept: application/pidf+xml,application/xml
Accept-Language: en-us
Accept-Encoding: gzip,deflate
Accept-Charset: ISO-8859-1,utf-8
X-Accept-ProfileEncoding: location=civic
Authorization: Digest username="server@example.com",
    realm="cellular.com",
    nonce="dcd98b7102dd2f0e8b11d0f600bfb0c093",
    qop=auth,
    nc=00000001,
    cnonce="0a4fl13b",
    response="6629fae49393a05397450978507c4ef1",
    opaque="5ccc069c403ebaf9f0171e9517f40e41"
Connection: close
```

After verifying that the application server 18 is authorized to receive confidential contextual information (step S154), the subscriber profile server 30 uses the client identifier, e.g., <clientToken> to access the requested contextual information and construct a contextual information response 40 that includes the context correlating to the requested elements (step S156). The subscriber profile server 30 returns the contextual information response 40 to the application server 18

(step S158). The contextual information response 40 may be an HTTP 200 OK message similar to that shown below:

```
HTTP/1.1 200 OK
Age: 0
Date: Mon, 24 Oct 2006 15:54:57 GMT
Last-Modified: Mon, 24 Oct 2006 15:50:04 GMT
Cache-Control: no-cache
Connection: close
Content-Length: nnn
Content-Type: application/pidf+xml; charset=ISO-8859-1
<?xml version="1.0"?>
<gp:geopriv xmlns="urn:...">
    <gp:location-info>
        <cl:civicAddress>
            <cl:country>US</cl:country>
            <cl:A1>New York</cl:A1>
            <cl:A3>New York</cl:A3>
            <cl:A4>Manhattan</cl:A4>
            <cl:A6>Broadway</cl:A6>
            <cl:HNO>123</cl:HNO>
<cl:FLR>4</cl:FLR>
            <cl:LOC>Room 456A</cl:LOC>
            <cl:PC>10036</cl:PC>
        </cl:civicAddress>
    </gp:location-info>
    <gp:usage-rules>
        <gp:retransmission-allowed>no</gp:retransmission-allowed>
    </gp:usage-rules>
</gp:geopriv>
```

If the application server 18 is not authorized to receive confidential contextual information (step S154), the subscriber profile server 30 the subscriber profile server 30 again sends an UNAUTHORIZED response to the application server 18 (step S160) indicating that the application server 18 is not currently authorized to retrieve the private contextual information and denies the request for private contextual information.

Figure 7:
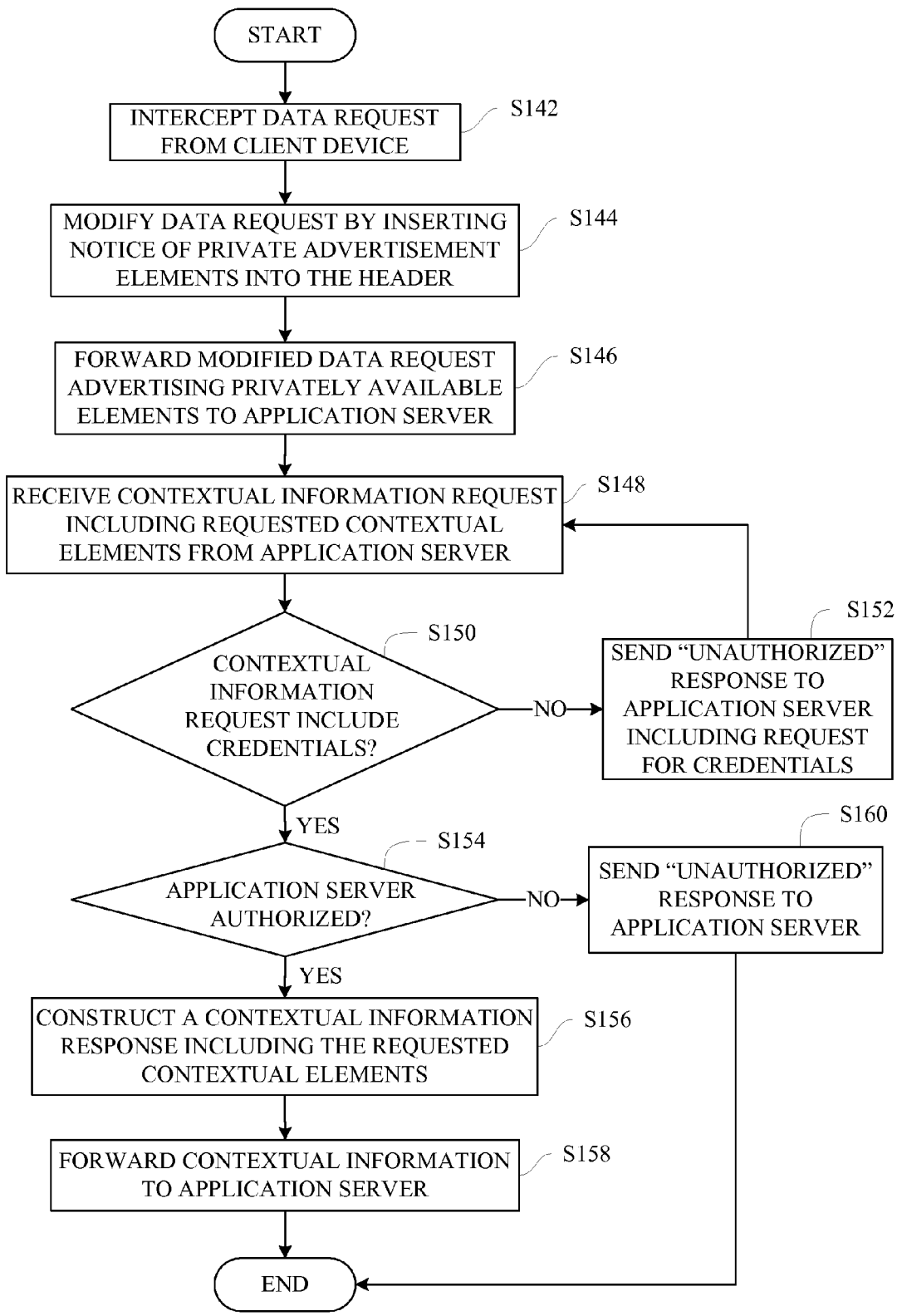
FIG. 7 is a flowchart of an exemplary contextual transaction process performed by a network access service provider, including the advertisement and retrieval of private contextual information according to the principles of the present invention.
Figure 8:
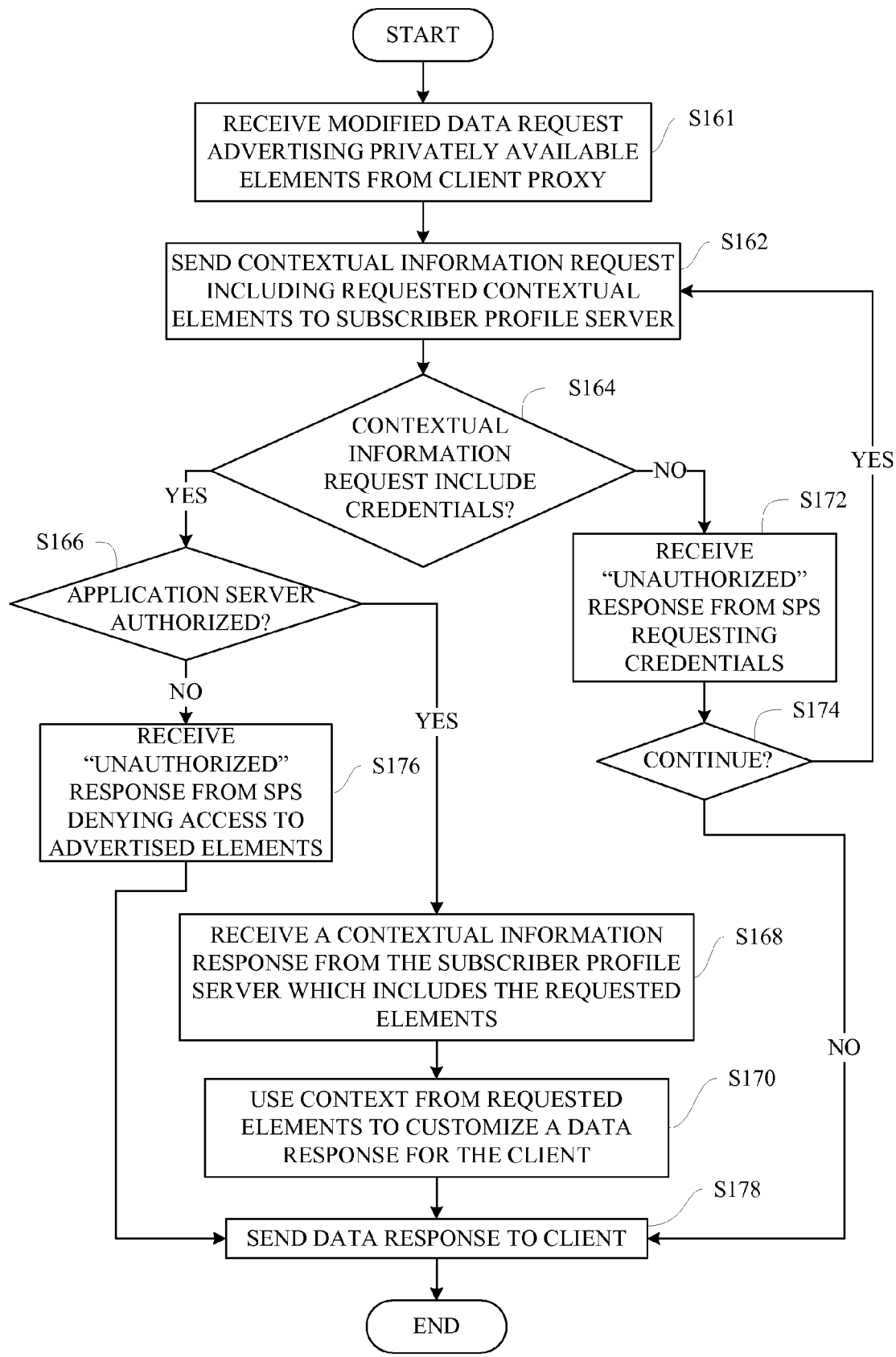
FIG. 8 is a flowchart of an exemplary contextual transaction process performed by an application service provider, including the acceptance of an advertisement and retrieval of private contextual information according to the principles of the present invention.

An exemplary method performed by an application server 18 in response to the process defined in FIG. 7 is described with reference to the flowchart in FIG. 8. The application server 18 receives a modified data request 34 (step S161) from the client proxy 24 which includes information advertising the availability of contextual information for the client 12 that the client has authorized the network access service provider 26 to privately release (see step S146). The application server 18 initiates a separate transaction to retrieve the client's advertised information by sending a contextual information request 38, such as a location request, to the subscriber profile server 30 of the network access service provider 26 that is designated in the modified data request 34 (step S162). The contextual information request 38 includes the advertised information that the application server 18 wishes to access (see step S148). If the contextual information request 38 includes authorization credentials for the application server 18 (step S164), and the application server 18 is authorized to receive the contextual information (step S166), then the application server 18 receives a contextual information response 40 from the subscriber profile server 30 (step S168) which includes the context of the requested advertised elements, e.g., location information (see step S158).

The application server 18 uses the context from the requested advertised elements contained in the contextual information response 40 to customize a data response 28, e.g., an HTTP 200 OK response, for the client 12 (step S170). This customization may take the form of location-specific information, local advertisements, etc. or it may be a response that is dictated by the current location of the client 12, e.g., inside a particular room, as shown below.

```
HTTP/1.1 200 OK
Age: 0
Date: Mon, 24 Oct 2006 15:55:01 GMT
Content-Length: nnn
Content-Type: text/html; charset=ISO-8859-1
Last-Modified: Mon, 24 Oct 2006 15:55:01 GMT
<content>
```

Returning to decision block S164, if the contextual information request 38 does not include authorization credentials for the application server 18, the application server 18 receives an "UNAUTHORIZED" response from the subscriber profile server 30 (step S172) indicating that the application server 18 is not currently authorized to retrieve the private contextual information and including an authentication challenge that the application server 18 may subsequently use to present its credentials. If the application server 18 decides to continue the procedure to receive the private contextual information (step S174), it may use the authentication challenge to create and forward a new contextual information request 38 to the subscriber profile server 30 (step S162) in order to properly present authorization credentials (see step S150). Once the subscriber profile server 30 has authorized the application server 18 (step S166), the application server 18 receives the contextual information response 40 from the subscriber profile server 30 (step S168) which includes the context of the requested advertised elements and proceeds to use the context of the advertised elements contained in the contextual information response 40 (see step S158) to customize a data response 28 for the client 12 (step S170), as described above. However, if at any time the subscriber profile server 30 determines that the application server 18 is not authorized to receive the private contextual information (step S166), then the application server 18 receives an UNAUTHORIZED response from the subscriber profile server 30 denying access to the advertised contextual information. In this case, the application server 18 is not able to customize its data response 28 to the client 12. Under any scenario, the process ends when the application server 18 sends a data response 28 to the client 12 (step S178), e.g., either customized for the client 12 or without the use of private contextual information.

In another embodiment, the WWW client proxy 24 inserts contextual information regarding the client 12 into an outgoing data request 16 from that client 12 in the form of an announcement, allowing the WWW application server 18 to subsequently extract and use that information without incurring the overhead of a separate transaction. An exemplary operational flowchart is provided in FIG. 9 illustrating steps performed by a network access service provider 20 for inserting announcements into an outgoing HTTP data request 16 from a client 12.

Figure 9:
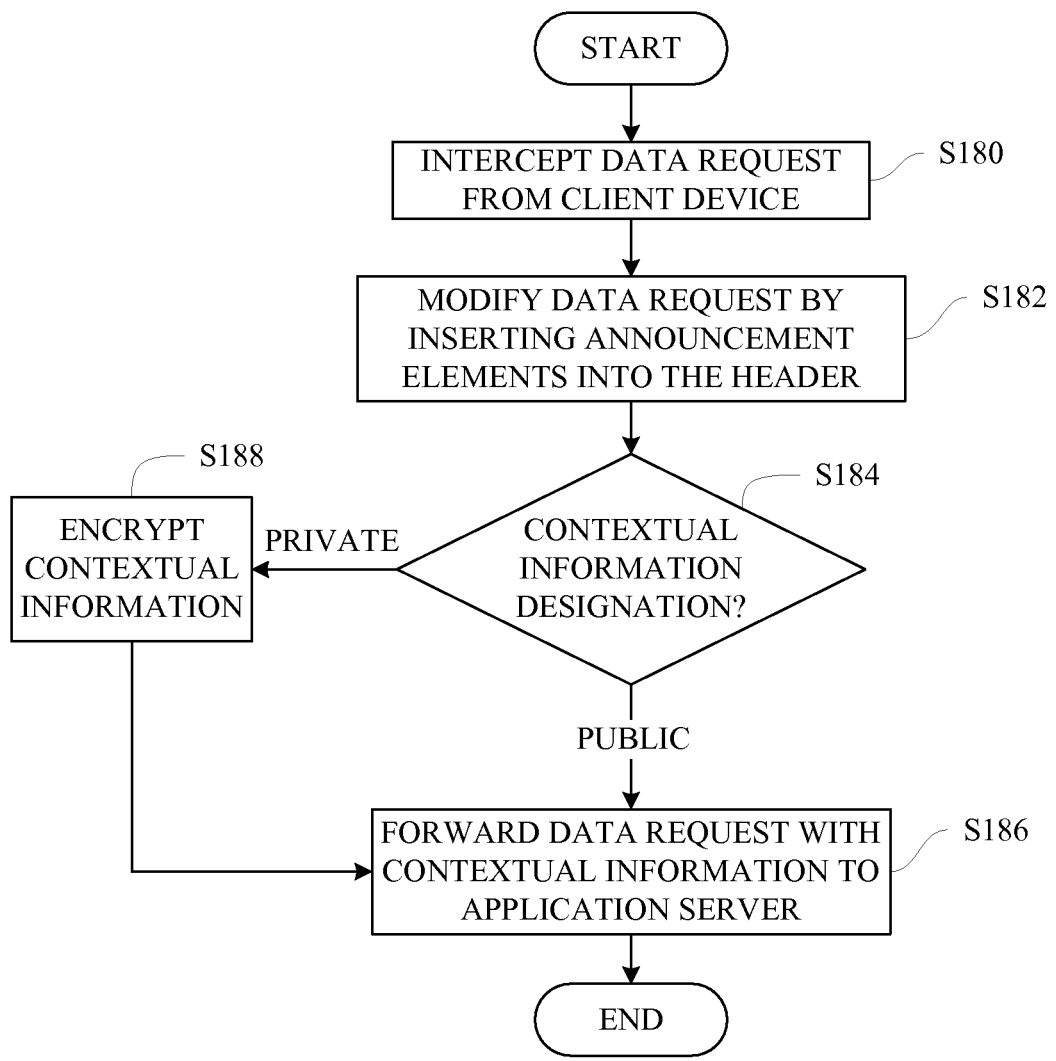
FIG. 9 is a flowchart of an exemplary contextual transaction process performed by a network access service provider, including the announcement of available contextual information according to the principles of the present invention.

As shown in FIG. 9, the WWW client 12 generates and sends a data request 16, e.g., an HTTP GET, towards a WWW application server 18, e.g., example.com in the example below located somewhere in the network 22. A typical data request 16 may include the following header elements:

```
GET / HTTP/1.1
Host: www.example.com
User-Agent: Mozilla/5.0 (Windows; en-US) Firefox/2.0
Accept: application/xhtml+xml,text/html
Accept-Language: en-us
Accept-Encoding: gzip,deflate
```

Accept-Charset: ISO-8859-1,utf-8
Keep-Alive: 30
Connection: keep-alive

The data request 16 is intercepted by a WWW client proxy 24 using well-known packet filtering and connection redirection techniques (step S180). The client proxy 24, based on information contained in its rules database, modifies the data request 16 by inserting announcement elements into the header 44 (step S182). If the contextual information associated with the client has been designated "public" (step S184), it is available for use by any entity that may receive and/or relay the modified data request 34. The client proxy 24 forwards the contextual information to application server 18 (step S186) without requiring a separate transaction to be initiated by the application server 18.

The modified data request 34 forwarded to the application server 18 may be similar to the following:

```
GET / HTTP/1.1
Host: www.example.com
User-Agent: Mozilla/5.0 (Windows; en-US) Firefox/2.0
Accept: application/xhtml+xml,text/html
Accept-Language: en-us
Accept-Encoding: gzip,deflate
Accept-Charset: ISO-8859-1,utf-8
X-Profile: profile=location, aspect=civic,
    content="Manhattan,New York,New York,US"
X-Profile: profile=identity, aspect=org,
    content="CitiBank"
X-Profile: profile=demography, aspect=anonymous, content="Male,25-
    35,Greek,en-us"
X-Profile: profile=device, aspect=display, content="640×480,VGA,
    colour,16-bit"
Keep-Alive: 30
Connection: keep-alive
```

Because the contextual information is being disseminated as "public" information, demographic information may be anonymous to protect the identity of the subscriber and location information may be imprecise, e.g., a portion of a civic address or a geographic area, rather than precise information, e.g., GPS coordinates, that may be deemed "private".

Returning to decision block S184, if the contextual information associated with the client 12 has been deemed "private," the client proxy 24 inserts the contextual information into the header 44 in an encrypted format (step S188) before forwarding the modified data request 34 to the application server 18 (step S186). The contextual information may only be decoded by an entity that has prior knowledge of the method and keys used to encrypt the location information.

The modified data request 34 forwarded to the application server 18 may be similar to the following:

```
GET / HTTP/1.1
Host: www.example.com
User-Agent: Mozilla/5.0 (Windows; en-US) Firefox/2.0
Accept: application/xhtml+xml,text/html
Accept-Language: en-us
Accept-Encoding: gzip,deflate
Accept-Charset: ISO-8859-1,utf-8
X-Profile: profile=identity, aspect=e164, content="12125551111"
X-Profile: profile=location, aspect=gps, nonce=3c9056385e64568b,
    content="902adb6671129e1e8469d60dfde9fd1"
Keep-Alive: 30
Connection: keep-alive
```

Note that the precise Global Positioning System ("GPS") location co-ordinates have been deemed "private" information and are, therefore, disseminated only in an encrypted form. Other contextual information may also be disseminated as clear text as part of a "public" announcement.

Figure 10:
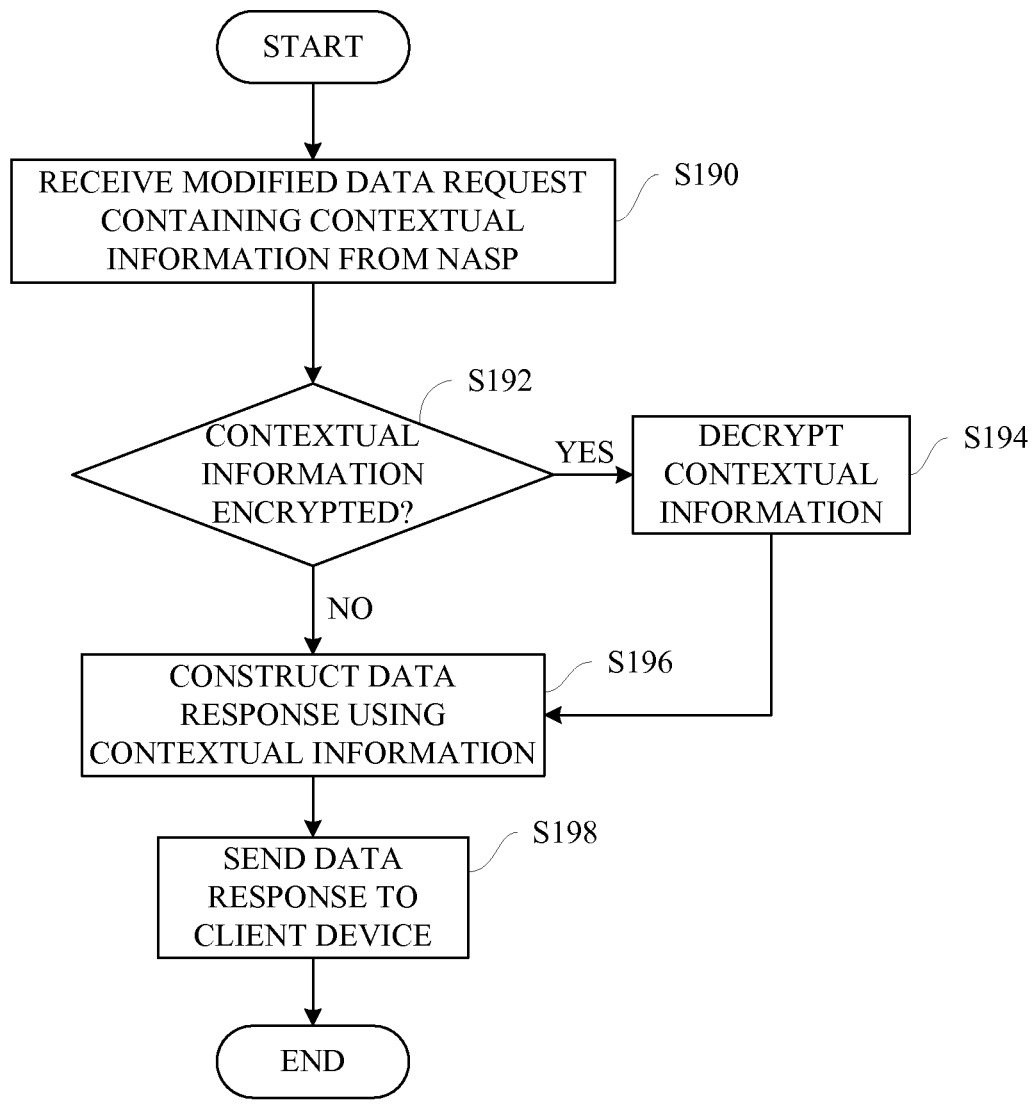
FIG. 10 is a flowchart of an exemplary contextual transaction process performed by an application service provider, including the reception of available contextual information contained in an announcement, according to the principles of the present invention.

An exemplary method performed by an application server 18 in response to the process defined in FIG. 9 is described with reference to the flowchart in FIG. 10. The WWW application server 18, which offers a context-aware service, receives the modified data request 24 (step S190) and recognizes the contextual information announced in the modified data request 34 (see step S186). If the contextual information has been encrypted (step S192), the application server 18 uses its knowledge of the encryption method and key to decrypt the embedded contextual information (step S194). The application server 18 uses the embedded contextual information to customize (step S196) and send (step S198) a data response 28 to the client 12. This customization may take the form of location-specific information, local and/or targeted advertisements, etc. and/or formatting that is customized to the type of display, or it may be a response that is dictated by the current location of the client 12, e.g., inside a particular room, as shown below:

```
HTTP/1.1 200 OK
Age: 0
Date: Mon, 24 Oct 2006 15:55:01 GMT
Content-Length: nnn
Content-Type: text/html; charset=ISO-8859-1
Last-Modified: Mon, 24 Oct 2006 15:55:01 GMT
<content>
```

In still another embodiment, the modified data request 34 sent from the WWW client proxy 24 to the application server 18 may also include end point reference material designating a location of alternate sources of contextual information related to the client 12, e.g., alternate subscriber profile servers. In response to a contextual information request 38 from the application server 18, the subscriber profile server 30 returns the end point reference to the application server 18 in a contextual information response 40, e.g., an HTTP 200 OK message similar to that shown below:

```
HTTP/1.1 200 OK
Age: 0
Date: Mon, 24 Oct 2006 15:54:57 GMT
Last-Modified: Mon, 24 Oct 2006 15:50:04 GMT
Cache-Control: no-cache
Connection: close
Content-Length: nnn
Content-Type: application/xml; charset=ISO-8859-1
<?xml version="1.0"?>
<wsa:EndpointReference
        xmlns:wsa="urn:..."
        xmlns:ds="urn:...">
    <wsa:Address>
        http://wsa.cellular.com
```

```
        </wsa:Address>
        <wsa:Metadata>
            <ds:ProviderID>http://cellular.com</ds:ProviderID>
            <ds:ServiceType>urn:id-sis-pp</ds:ServiceType>
            <ds:Options>
                <ds:Option>urn:id-sis-pp</ds:Option>
                <ds:Option>urn:id-sis-ep</ds:Option>
            </ds:Options>
        </wsa:Metadata>
    </wsa:EndpointReference>
```

In the above example, the designated profile server (wsa-.cellular.com) offers both a personal profile ("pp") and an employee profile ("ep") for this subscriber 32. Additional end point references may be given for other profiles associated with this subscriber, e.g., location.

The application server 18 uses the end point reference material to construct a web services query that requests contextual information associated with the subscriber. The web services query may be similar to that shown below:

```
<?xml version="1.0"?>
<soap:Envelope xmlns="http:...">
    <soap:Header>
        ...
    </soap:Header>
    <soap:Body>
        <Query xmlns="urn:id-sis-pp">
            <RequestedService>
                <ServiceType>urn:id-sis-pp:
                Demographics</ServiceType>
            </RequestedService>
        </Query>
    </soap:Body>
</soap:Envelope>
```

The designated subscriber profile server returns the requested information to the application in a query response which may be similar to that shown below:

```
<?xml version="1.0"?>
<soap:Envelope xmlns="http:...">
    <soap:Header>
        ...
    </soap:Header>
    <soap:Body>
        <QueryResponse xmlns="urn:id-sis-pp">
            <RequestedService>
                <ServiceType>urn:id-sis-pp:
                Demographics</ServiceType>
                <pp:Demographics>
                    <pp:DisplayLanguage>en-us</pp:
                    DisplayLanguage>
                    <pp:Language>en</pp:Language>
                    <pp:MaritalStatus>single</pp:MaritalStatus>
                    <pp:Gender>m</pp:Gender>
                    <pp:Birthday>12-16</pp:Birthday>
                    <pp:AgeGroup>18-25</pp:AgeGroup>
                    <pp:TimeZone>+05:00</pp:TimeZone>
                </pp:Demographics>
            </RequestedService>
        </QueryResponse>
    </soap:Body>
</soap:Envelope>
```

In another embodiment, the modified data request 34 sent from the WWW client proxy 24 to the application server 18 may include the identity of the profile to be associated with the client 32, allowing the application server 18 to subsequently access and use that information without incurring the overhead of a separate transaction. The contextual information associated with the identified profile has been previously distributed to the application service provider 20 by the network access service provider 26 using a mechanism that is outside the scope of this invention. This profile may contain information that is specific to the subscriber 32 and/or the client 14 or it may be generic to comply with privacy policies. The modified data request 34 forwarded to the application server 18 may be similar to the following:

```
GET / HTTP/1.1
Host: www.example.com
User-Agent: Mozilla/5.0 (Windows; en-US) Firefox/2.0
Accept: application/xhtml+xml,text/html
Accept-Language: en-us
Accept-Encoding: gzip,deflate
Accept-Charset: ISO-8859-1,utf-8
X-Profile: identifier="Profile-90210"
Keep-Alive: 30
Connection: keep-alive
```

Because the contextual information is being disseminated as a private reference that is only meaningful to the network access service provider 26 and to the application service provider 20, this information cannot be seen or accessed by any other entity that may receive and/or relay the data request 34. The application server 18, which offers a context-aware service, recognizes the profile announcement element in the data request 34 and uses the referenced contextual information to customize a data response 28 to the client 12, as shown below. This customization may take the form, e.g., of local and/or targeted advertisements, text in the preferred language of the subscriber 32, or formatting that is customized to the type of display.

```
HTTP/1.1 200 OK
Age: 0
Date: Mon, 24 Oct 2006 15:55:01 GMT
Content-Length: nnn
Content-Type: text/html; charset = ISO-8859-1
Last-Modified: Mon, 24 Oct 2006 15:55:01 GMT
<content>
```

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for advertising the existence of a subscriber profile service on a communication network, the method comprising:
intercepting a first data request sent from a client device associated with a subscriber to an application server;
modifying the data request by inserting an advertisement of contextual information relating to the existence of the subscriber profile service into the first data request prior to transmission to the application server, the advertisement of contextual information being inserted into an extension header for the first data request;
transmitting the modified data request to the application server;
receiving a second data request from the application server identifying a subset of the contextual information that the application server wishes to access, the identified subset of the contextual information being a subset of a total contextual information relating to the subscriber;
retrieving the identified subset of the contextual information from the subscriber profile service; and
transmitting the identified subset of the contextual information to the application server.

2. The method of claim 1, wherein the extension header includes a Uniform Resource Locator ("URL") for the subscriber profile server, a client field identifying a subscriber, a profile field identifying a type of profile maintained by the subscriber profile server, and an aspect field listing a type of information for a specific profile.

3. The method of claim 1, wherein the extension header includes a random number generated for encryption purposes.

4. The method of claim 2, wherein the type of profile is at least one of a profile identifier, a location profile, a device profile, a demography profile, a personal profile, a contact profile, a professional profile, a presence profile, a preferences profile, a network resource usage profile, and an identity profile.

5. The method of claim 1, further comprising:
prior to retrieving the identified subset of the contextual information, verifying that the application server is authorized to receive the identified advertised contextual information.

6. The method of claim 1, further comprising:
prior to transmitting the identified subset of the contextual information, encrypting the identified subset of the contextual information.

7. A network access service device comprising:
a subscriber profile service including contextual information relating to at least one of a client device and a subscriber; and
a client proxy communicatively coupled to the subscriber profile service, the client proxy:
intercepting a first data request sent from the client device to an application server on a communication network;
modifying the first data request by inserting an advertisement of contextual information relating to the existence of the subscriber profile service into the first data request prior to transmission to the application server, the advertisement of contextual information being inserted into an extension header for the first data request;
transmitting the modified data request to the application server;
receiving a second data request from the application server identifying a subset of the contextual information that the application server wishes to access, the identified subset of the contextual information being a subset of a total contextual information relating to the at least one of the client device and the subscriber;
retrieving the identified subset of the contextual information from the subscriber profile service; and
transmitting the identified subset of the contextual information to the application server.

8. The network access service device of claim 7, wherein the extension header includes a Uniform Resource Locator ("URL") for the subscriber profile server, a client field identifying a subscriber, a profile field identifying a type of profile maintained by the subscriber profile server, and an aspect field listing a type of information for a specific profile.

9. The network access service device of claim 8, wherein the extension header further includes a random number generated for encryption purposes.

10. The network access service device of claim 8, wherein the type of profile is at least one of a profile identifier, a location profile, a device profile, a demography profile, a personal profile, a contact profile, a professional profile, a presence profile, a preferences profile, a network resource usage profile, and an identity profile.

11. The network access service device of claim 7, wherein prior to retrieving the identified subset of the contextual information, the subscriber profile service further verifies that the application server is authorized to receive the identified subset of the contextual information.

12. The network access service device of claim 7, wherein prior to transmitting the identified subset of the contextual information, the subscriber profile service further encrypts the identified subset of the contextual information.

13. A method for advertising contextual information maintained at a subscriber profile server on a communication network, the contextual information relating to at least one of a client device and a subscriber to a network access service provider, the method comprising:
intercepting a first data request sent from the client device to an application server;
modifying the first data request by inserting an advertisement of the contextual information into the first data request as an extension header prior to transmission to the application server, the advertisement of the contextual information relating to the existence of the subscriber profile server;
transmitting the modified data request to the application server;
receiving a second data request from the application server identifying a subset of the contextual information that the application server wishes to access, the identified subset of the contextual information being a subset of a total contextual information relating to the at least one of the client device and the subscriber;
retrieving the identified subset of the contextual information from the subscriber profile service; and
transmitting the identified subset of the contextual information to the application server.

14. The method of claim 13, further comprising: prior to transmitting the modified data request, encrypting the contextual information.

* * * * *

UNITED STATES PATENT AND TRADEMARK OFFICE
CERTIFICATE OF CORRECTION

PATENT NO. : 8,554,718 B2  
APPLICATION NO. : 12/123939  
DATED : October 8, 2013  
INVENTOR(S) : William A. Gage Page 1 of 1

It is certified that error appears in the above-identified patent and that said Letters Patent is hereby corrected as shown below:

In the Claims

Column 23, line 49, Claim 5, replace "advertised" with --subset of the--.

Signed and Sealed this  
Twenty-first Day of October, 2014

Michelle K. Lee  
*Deputy Director of the United States Patent and Trademark Office*